No. 712,880. Patented Nov. 4, 1902.
F. WILLIAMS.
WEIGHING AND PRICE INDICATING APPARATUS.
(Application filed Apr. 12, 1897.)
(No Model.) 4 Sheets—Sheet 1.

Witnesses
Norris A. Clark.
Geo. S. Lamb.

Inventor
Francis Williams
By Geo. P. Whittesey
Attorney.

THE NORRIS PETERS CO., PHOTO-LITHO., WASHINGTON, D. C.

No. 712,880. Patented Nov. 4, 1902.
F. WILLIAMS.
WEIGHING AND PRICE INDICATING APPARATUS.
(Application filed Apr. 12, 1897.)
(No Model.) 4 Sheets—Sheet 3.

No. 712,880. Patented Nov. 4, 1902.
F. WILLIAMS.
WEIGHING AND PRICE INDICATING APPARATUS.
(Application filed Apr. 12, 1897.)

(No Model.) 4 Sheets—Sheet 4.

UNITED STATES PATENT OFFICE.

FRANCIS WILLIAMS, OF RUABON, ENGLAND, ASSIGNOR TO THE COMPUTING SCALE COMPANY, OF DAYTON, OHIO.

WEIGHING AND PRICE-INDICATING APPARATUS.

SPECIFICATION forming part of Letters Patent No. 712,880, dated November 4, 1902.

Application filed April 12, 1897. Serial No. 631,694. (No model.)

*To all whom it may concern:*

Be it known that I, FRANCIS WILLIAMS, a subject of the Queen of England, residing at Ruabon, England, have invented certain new and useful Improvements in or Relating to Weighing and Price-Indicating Apparatus, of which the following is a specification.

This invention relates to apparatus for weighing articles or goods and indicating the price to be paid for them.

The object of this invention is to provide a simple and practical computing mechanism designed principally for use in connection with spring-balance scales, although, as will be obvious to those skilled in the art, features of the invention may be used in connection with scales of other types.

The invention will be best understood by reference to the accompanying drawings, in which—

Figure 1:
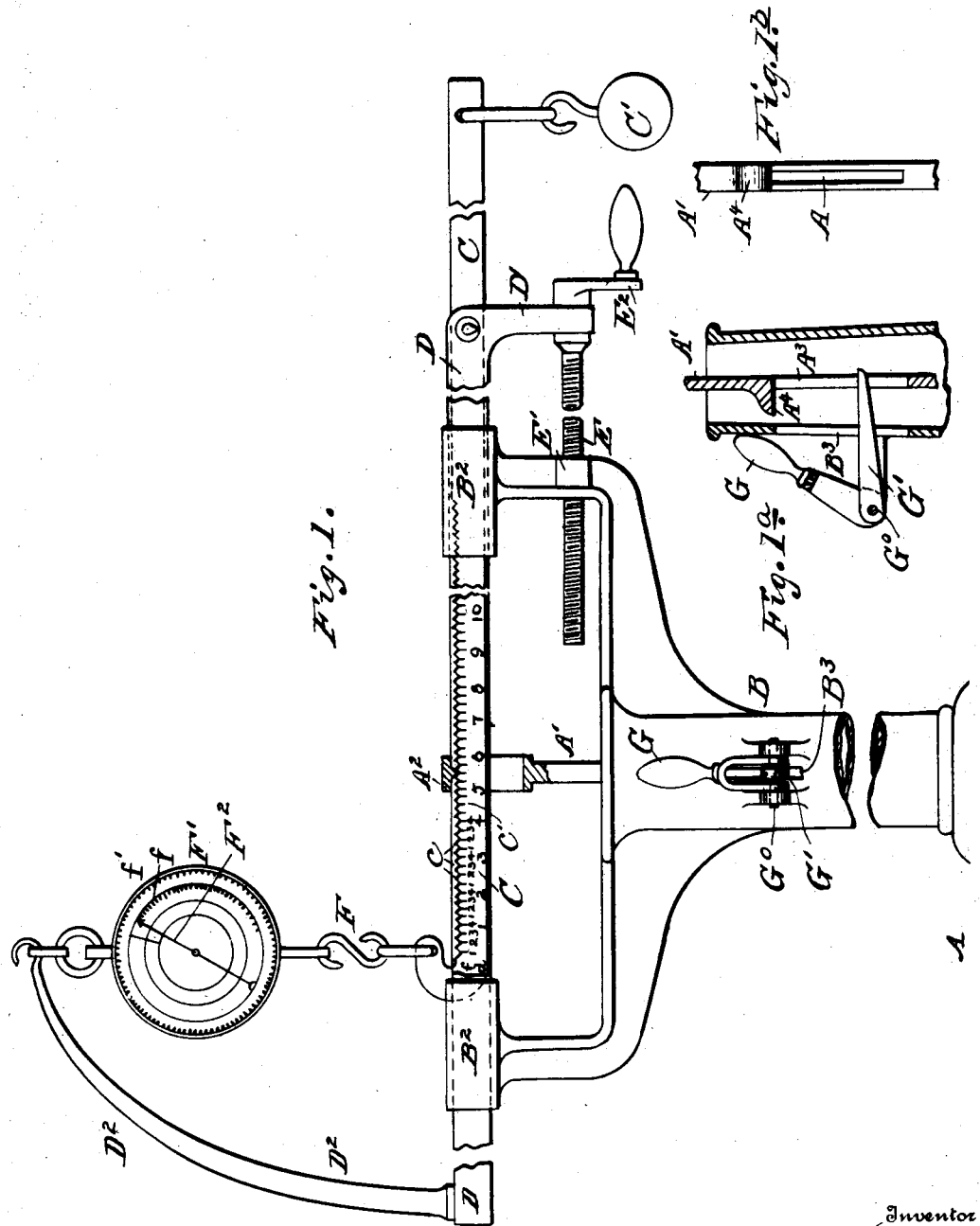
Figure 2:
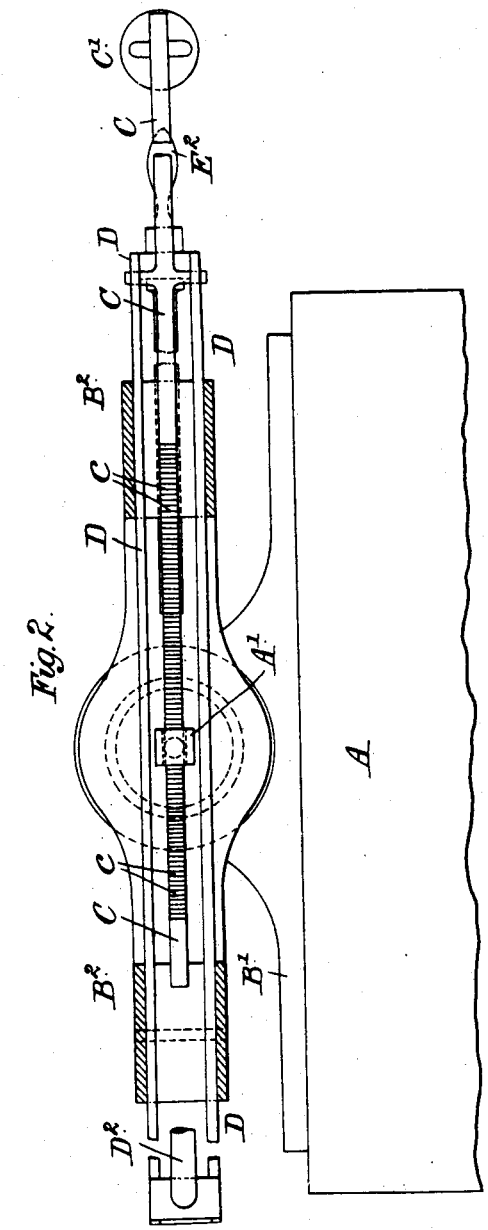
Figure 3:
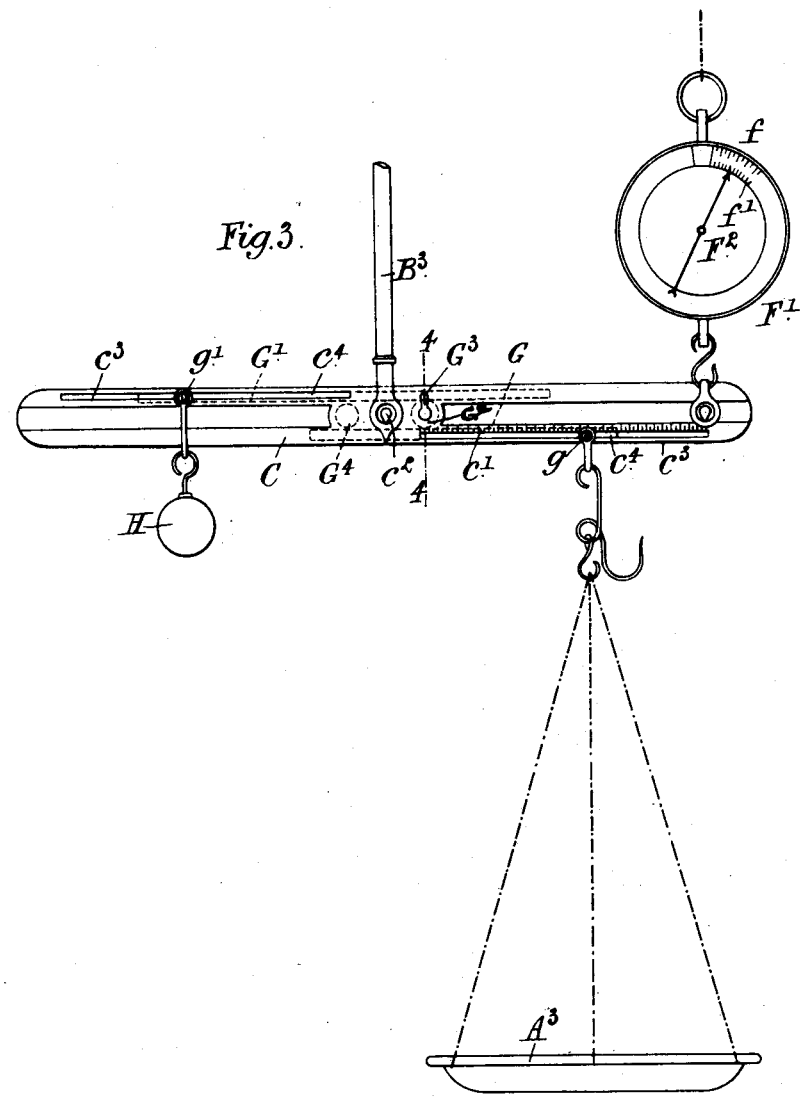
Figure 4:
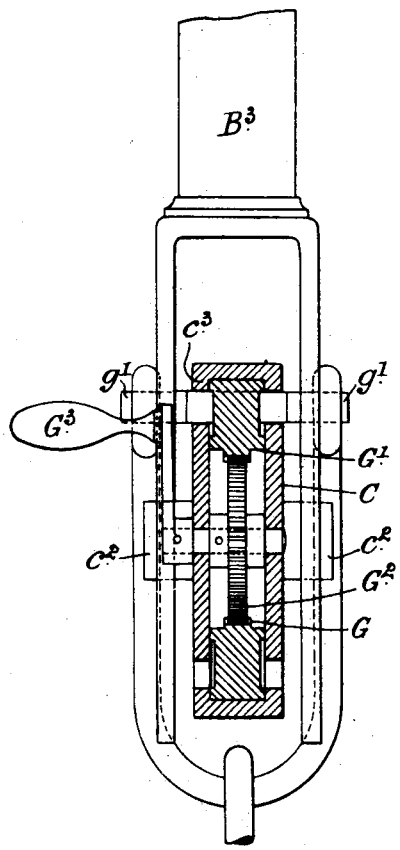

Figure 1 is a front elevation of a portion of one form of my improved weighing apparatus; Figs. $1^a$ and $1^b$, details of the means employed for lifting the platform-rod out of engagement with the steelyard. Fig. 2 is a plan of Fig. 1, partly in horizontal section. Fig. 3 is an elevation of a modified form of the apparatus shown in Fig. 1. Fig. 4 is a vertical section on the line 4 4 of Fig. 3, but drawn to a scale larger than that to which Fig. 3 is drawn.

Like letters indicate like parts throughout the drawings.

According to the first part of this invention, which I will describe in connection with a platform weighing apparatus, as shown in Figs. 1 and 2, although it is not limited to use solely with this class of apparatus, I mount the platform A on suitable knife-edges and carry the rod $A'$, connected with the platform, up through a suitable standard B, connected to the base $B'$, and balance the platform and rod all in substantially the manner usual in such arrangements. At the top of the rod $A'$, which for convenience I hereinafter term the "platform-rod," I provide a knife-edge or equivalent $A^2$, capable of engaging with a steelyard C, pivoted, preferably, at or near one end to a frame D, which is adjustable in relation to the platform A or platform-rod $A'$. This frame may be mounted in standards or brackets $B^2$, secured to the standard B or other fixed part of the apparatus, and may be moved therein by a threaded rod E, which engages with a fixed nut $E'$, and may be rotated by a handle $E^3$, the threaded rod E being pivoted and prevented from moving longitudinally in a bracket-arm $D'$, depending from the above-named frame D, or the frame D may be adjusted in the brackets $B^2$ by a rack-and-pinion or other suitable mechanism.

The steelyard C at one end is provided with a balance-weight $C'$ and at the other end is connected—as, for example, through a hook and link F—with a spring-balance $F'$, such as those known as "Salter's spring-balances," which is supported by a bracket-arm $D^2$, connected to and movable with the adjustable frame D. The face of this balance $F'$ has scales $f\,f'$, the scale $f$ indicating money divisions—such as pounds, shillings, pence, and farthings—and the scale $f'$ ordinary weight-divisions—such as stones, pounds, ounces, &c., or vice versa—and an index-pointer $F^2$, moved by the "load," indicates on the scales $f\,f'$ the price and weight of the goods, respectively.

From the foregoing it will be seen that the steelyard C is capable of being moved so that through the knife-edge $A^2$ different parts of it may be brought under the influence of the load—that is to say, the article or material to be weighed. The steelyard is preferably notched, as at $c$, so that the platform-rod $A'$ may be caused to engage with certain definite parts, these differing according to the price per unit to be paid for the goods weighed.

The teeth $c$ are for the sake of clearness shown in the drawings as being larger than their actual size; but they would in practice be made so small that they would not interfere materially with the lengthwise adjustment of the steelyard C by movement of the frame D.

In Figs. 1, $1^a$, and $1^b$ I have illustrated a convenient arrangement for raising the platform-rod $A'$ out of engagement with the steelyard C when the weighing apparatus is not in use or when the steelyard is being adjusted, as previously described, in relation to the platform-rod. G is a hand-lever secured on a shaft $G^0$, on which is also secured an arm $G'$, which is movable vertically in a slot $B^3$ in the standard B and takes into a slot $A^3$ in the lower portion A of rod $A'$, said arm $G'$ being adapted to engage a lug $A^4$ on the rod $A'$ when the lever G has been swung down, thus raising and holding the rod $A'$ out of engagement with the teeth $c$.

The steelyard has scale-markings $c'$ corresponding with the above-named notches $c$ and the different prices per unit of weight of the goods to be sold. Thus it may have forty-eight notches and divisions and be of such length as to weigh goods varying in price from, say, for example, a farthing up to a shilling per pound, each of the forty-eight notches $c$ and divisions of the scale $c'$ representing a farthing difference per pound. The steelyard C may, however, be notched and divided to correspond with other money systems and be of any desired length to weigh goods at any required price.

In operation the apparatus is used as follows: Supposing a customer requires, say, seven pounds of goods at three pence three farthings per pound, the attendant adjusts the movable frame D so as to first bring the spring-balance $F'$ directly over the platform-rod $A'$ (when any goods placed on the platform A will cause the latter to descend as though it were directly connected with the balance, as in an ordinary weighing-machine) and then places sufficient goods upon the platform to bring the index $F^2$ to the seven-pound division of the weight-scale, after which in order to ascertain the gross price of the goods he adjusts the movable frame D so as to bring the three-penny three-farthing division of the steelyard-scale $c'$ up to the platform-rod $A'$, when the index $F^2$ on the spring-balance $F'$ will move to the two-shilling and two-pence farthing mark thereon, which indicates the price to be paid for the goods.

Instead of making the steelyard C adjustable in relation to the platform A or platform-rod $A'$ the platform or platform-rod may be made adjustable in relation to the steelyard.

In the weighing apparatus shown in Figs. 3 and 4 the steelyard C is pivoted at or near its center by means of knife-edges $c^2$ to a suitable bracket $B^3$, which in the example illustrated is supposed to be connected to an overhead support. One end of the steelyard is connected to a spring-balance $F'$, as in the previously-described apparatus, this balance, like that shown in Fig. 1, having a weight-scale $f'$ and a total-value scale $f$ upon its dial or indicator. On the steelyard I mount two toothed racks G $G'$, fitted to move in suitable guides $c^3$, and a spur-pinion $G^2$, engaging with both of the racks in such a manner that when the pinion is rotated the racks will move in opposite directions each to the same extent as the other. The pinion $G^2$ is mounted in bearings in the steelyard C and is provided with a handle or equivalent $G^3$ to enable it to be readily rotated. The pinion $G^2$ and its connections are balanced by a weight $G^4$ at the opposite side of the knife-edges $c^2$. From or near the end of the rack G which is nearest the spring-balance $F'$, I suspend a scale-pan or equivalent $A^3$ to receive the goods to be weighed, and from or near the opposite end of the rack $G'$, I suspend a weight H to balance the scale-pan $A^3$. If H be different in weight from the scale-pan $A^3$, the two racks G $G'$ may be moved along the steelyard C at different speeds, provided the proper ratio be maintained throughout their movements. The scale-pan $A^3$ and weight H are conveniently connected to the racks G $G'$ by knife-edged bars $g$ $g'$, passing through the said racks and through slots $c^4$ in the guide $c^3$. The steelyard C has scale-markings $c'$, indicating the position to which the racks G $G'$, and consequently the scale-pan $A^3$, must be adjusted to correspond with the different prices per unit of weight of the goods to be weighed. Thus it may have forty-eight divisions and be of such length as to weigh goods varying in price, say, from a farthing up to a shilling per pound or other unit of weight, each of the forty-eight divisions representing a farthing difference per unit. The steelyard may, however, be divided to correspond with any other money system and be of any desired length to weigh goods at any required price.

The last-described apparatus is used as follows: Supposing a customer requires, say, six and three-quarter pounds of goods at three pence per pound, the attendant first moves the racks G $G'$ into their extreme outward position, wherein the scale-pan $A^3$ is directly beneath the spring-balance, (when any goods placed therein will cause the scale-pan to descend and the index $F^2$ to be moved as though the scale-pan were directly connected with the balance,) and then charges the goods into the scale-pan until the index $F^2$ reaches the "$6\frac{3}{4}$" mark on the weight-scale $f'$, after which in order to ascertain the total value of the goods he moves the racks G $G'$ inward until the scale-pan is at the three-penny division of the steelyard-scale $c'$, when the index will move to the mark indicating one shilling and eight pence farthing, which is the amount to be paid or received.

I claim—

1. In a weighing and price-indicating apparatus, the combination, with a frame, a scale-beam supported thereby, a weight-indicating device connected with the scale-beam, a load-carrier and its connection with the scale-beam, and means for adjusting the scale-beam and connection of the load-carrier relatively to each other, the range of adjustment of the load-carrier connection extending to a point vertically in line with the point of connection of the weight-indicating device.

2. In a weighing and price-indicating apparatus, the combination, with a frame and a scale-beam supported thereby, a weight-indicating device connected with the scale-beam having concentric weight and price-indicating scales thereon and a single index registering with both scales, a load-carrier and its connection to the scale-beam, and means for adjusting the load-carrier connection and the scale-beam relatively to each other, the range of adjustment of the load-carrier connection extending to a point, which puts the entire load on, and causes it to be indicated on the weight-indicating device.

In testimony whereof I have hereto set my hand in the presence of the two subscribing witnesses.

FRANCIS WILLIAMS.

Witnesses:
H. M. BROOKFIELD DAVIES,
THOS. E. BELLIS.